Figure 1:
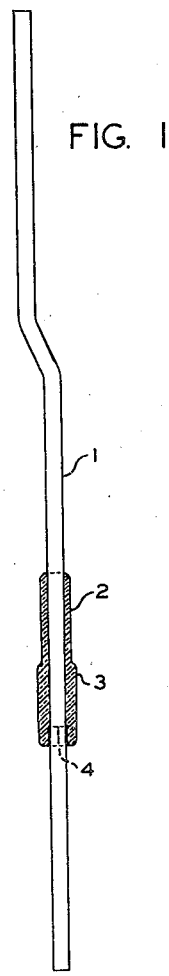

Sept. 18, 1934.  L. C. GOODALE  1,974,305

VACUUM TUBE CONSTRUCTION

Filed Sept. 22, 1932

INVENTOR
LYNN C. GOODALE
BY *C. C. Hopgood*
ATTORNEY

Patented Sept. 18, 1934

1,974,305

UNITED STATES PATENT OFFICE 1,974,305

VACUUM TUBE CONSTRUCTION

Lynn C. Goodale, Belleville, N. J., assignor to Federal Telegraph Company, Newark, N. J., a corporation of California Application September 22, 1932, Serial No. 634,321

3 Claims. (Cl. 250—27.5)

The present invention relates to the manufacture of vacuum tubes and like articles and especially to the sealing of metal wires or conductors in vitreous materials. One of the difficulties encountered in the manufacture and operation of vacuum tubes is the provision of a seal for the lead-in conductors which prevents air leakage into the tubes during exhaust and manufacture, and which is uniform throughout the product. Many types of seal have been made but, in a great number of instances, the uniformity of the seals has been such that no prediction as to the condition of the tube could be made.

By this invention it is made possible to manufacture vacuum tubes having seals of such uniform quality that the number of tube failures, both during manufacture and operation, is reduced to a negligible quantity.

The object of the invention is to produce a lead-in seal for vacuum tubes of such quality that the number of tube failures due to leakage into such tubes at the seal shall be materially reduced.

The invention will be more clearly understood and further objects of the invention will appear when the accompanying drawing is considered in connection with the following specification.

Figure 2:
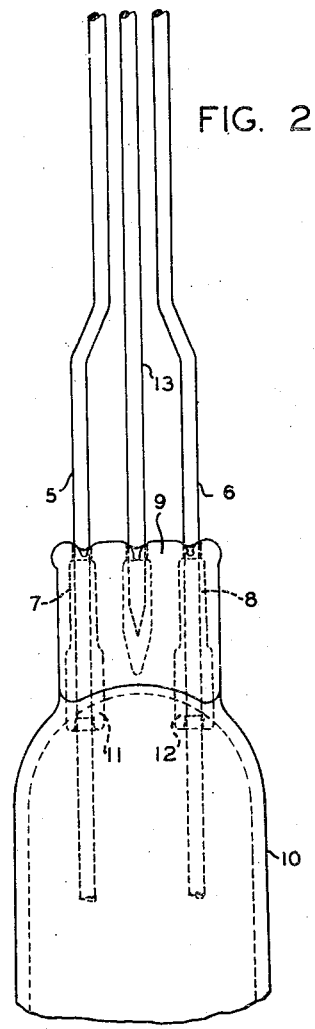

In the drawing,

Fig. 1 shows, in cross-section, a preferred form of beaded lead-in conductor; and Fig. 2 is a fragmentary view of a vacuum tube with lead-in conductors sealed into the envelop thereof.

The seal for the vacuum tube is made in the following manner: a lead-in conductor of tungsten or other electrically conductive material has a bead of glass or other vitreous material formed thereon. This bead is made in a particular manner which comprises slipping a thin tube of glass, having a length of approximately the length of the press of the vacuum tube in which the conductor is to be used, over the conductor; welding the conductor to the tube by slowly rotating the whole in a flame; building up on one end of the glass tube a rim of molten glass by bringing a body of glass into contact with the tube end while still rotating the conductor in the flame; and finally removing the flame somewhat from the glass rim and working the rim over into a flange. Since the flame was somewhat removed prior to the final step, the outer edge of the flange is not welded to the tungsten, that edge being too cool for a weld to be effected. This leaves the device as shown in Fig. 1, in which 1 represents a tungsten lead-in, 2 a tube of glass welded thereto, and 3 the flattened rim. It will be seen that, from the point marked 4 to the end of the glass rim, there is no weld between the glass and the tungsten, or, in other words, that the glass has not "wet" the tungsten.

The tungsten rod with the bead of glass thereon is subsequently united to the press of a tube in the usual manner, a fraction of the length of the bead projecting from the end of the press.

Fig. 2 shows a fragmentary view of a vacuum tube showing conductors 5, 6, having the beads 7, 8 respectively thereon, sealed into a press 9 on the re-entrant stem 10 of a vacuum tube envelop (not shown). The beads project from the lower end of the press 9, as is seen clearly at points designated 11 and 12. Electrodes are supported by conductors 5 and 6, as well as by the rod 13 also sealed in the press.

The particular advantage derived from this method of installing the lead-in seems dependent upon the fact that the weld does not extend throughout the length of the glass bead, and a slight straining of the conductor is possible before any cracking of the glass occurs.

This arrangement has, in practice, reduced the number of tube failures to a negligible quantity and is more effective than any other sealing-in method yet known or devised.

It is to be noted that, by the use of the well known method of installing lead-in conductors in the press, a result similar to that obtained at the lower end is achieved at the upper end of the press. In installing the conductors, the beaded portion is permitted to extend at the upper end to a point a short distance below that at which the press is to terminate, and, since the glass in relatively cool when the press is made, it does not weld to the tungsten or other conductor beyond the beaded portion. Thus, there is no weld between the conductors and the press for a short distance at the upper end of the latter.

The foregoing is given for purposes of description only and is not to be considered as limiting the scope of the appended claims.

What is claimed is:

1. A vacuum tube seal consisting essentially of a press, a plurality of conductors passing therethrough, each of said conductors having thereon a bead of vitreous material, one end of which is welded thereto and the other end of which lies closely adjacent but is not welded to said conductor, said beads being united to said press along substantially all the welded portion of said beads, said unwelded portion protruding from said press.

2. A vacuum tube seal consisting essentially of a press, a plurality of conductors passing therethrough, each of said conductors having thereon a bead of vitreous material one end of which is welded to said conductor and the other end of which lies closely adjacent but is not welded to said conductor, said beads being united to said press along substantially all the welded portion of said beads, said unwelded portion protruding from said press at one end thereof, and a short unbeaded portion of said conductors being within said press but unwelded thereto at the other end.

3. A vacuum tube seal consisting essentially of a stem, a conductor passing through and having thereon a bead welded thereto at one end and having its other end lying closely adjacent but not welded thereto, said bead being united to said stem along substantially all the welded portion thereof with the unwelded portion protruding from said stem, and the welded end of the bead lying within said stem with an adjacent short unbeaded portion of the conductor lying within the stem but not united thereto.

LYNN C. GOODALE.